United States Patent
Abu-Salih et al.

(10) Patent No.: US 8,313,839 B2
(45) Date of Patent: Nov. 20, 2012

(54) ELECTROSTATIC MODULATION OF SURFACE ROUGHNESS

(75) Inventors: Samy Abu-Salih, Sakhnin (IL); David Elata, Haifa (IL)

(73) Assignee: Technion Research and Development Foundation Ltd., Haifa (IL)

(*) Notice: Subject to any disclaimer, the term of this patent is extended or adjusted under 35 U.S.C. 154(b) by 1341 days.

(21) Appl. No.: 12/086,677

(22) PCT Filed: Sep. 19, 2004

(86) PCT No.: PCT/IL2004/000856
§ 371 (c)(1),
(2), (4) Date: Sep. 8, 2009

(87) PCT Pub. No.: WO2005/027185
PCT Pub. Date: Mar. 24, 2005

(65) Prior Publication Data
US 2009/0324976 A1    Dec. 31, 2009

Related U.S. Application Data

(60) Provisional application No. 60/503,779, filed on Sep. 18, 2003.

(51) Int. Cl.
B32B 15/06 (2006.01)
B29C 59/16 (2006.01)
B29D 11/00 (2006.01)
(52) U.S. Cl. .......... 428/450; 264/2.6; 264/2.7; 264/446; 428/465
(58) Field of Classification Search ................... 264/2.6, 264/2.7, 446; 428/450, 465
See application file for complete search history.

(56) References Cited

U.S. PATENT DOCUMENTS
6,188,160 B1  2/2001  Main et al.

OTHER PUBLICATIONS
International Search Report for PCT/IL04/000856 mailed Aug. 29, 2005.
M. Hetényi, "Beams on Elastic Foundation", U. of Mich. Press, Ann Arbor, 1946, Chapter VII, pp. 141-150.

Primary Examiner — D. S. Nakarani
(74) Attorney, Agent, or Firm — Pearl Cohen Zedek Latzer, LLP

(57) ABSTRACT

A method for modulating roughness of a surface, comprising: providing a first pre-stressed electrically conductive layer (10) coupled to a dielectric elastic foundation (20) provided over a second conductive layer (30); and subjecting the two conductive layers to a voltage difference, thereby modulating the roughness of the first surface.

15 Claims, 3 Drawing Sheets

ELECTROSTATIC MODULATION OF SURFACE ROUGHNESS

CROSS-REFERENCE TO RELATED APPLICATIONS

This application is a National Phase Application of PCT International Application No. PCT/IL2004/000856, International Filing Date Sep. 19, 2004, claiming priority of U.S. Provisional Patent Application, 60/503,779, filed Sep. 18, 2003.

FIELD OF THE INVENTION

The present invention relates to surface texture control. More particularly it relates to electrostatic modulation of surface roughness.

BACKGROUND OF THE INVENTION

The roughness of surfaces is an important parameter, affecting many issues. For example, smooth planar surfaces may be used to reflect and redirect a beam of light. In contrast, rough surfaces may be used to disperse a light beam. As another example, smooth and rough surfaces also differ in the drag they induce on surrounding fluid flow.

A mechanism that can switch on and switch off surface roughness is therefore a desirable enabling technology that can be used in optical applications, drag reduction applications and many more applications, where modulating the surface roughness can result in controlling another physical property.

The present invention describes method and system for achieving on/off switching of surface roughness.

BRIEF DESCRIPTION OF THE INVENTION

A main aspect of the present invention is the use of electrostatic forces to change the roughness properties of a surface and the termination of the electrostatic forces to regain the initial roughness property (or smoothness). The present invention enables to change the surface characteristics in a binary mode of operation. This is achieved with minimal power because holding the switch in the rough state requires application of a voltage but does not require a current.

There is thus provided, in accordance with some preferred embodiments of the present invention, a method for modulating roughness of a surface, comprising:
providing a first pre-stressed electrically conductive layer coupled to a dielectric elastic foundation provided over a second conductive layer; and
subjecting the two conductive layers to a voltage difference, thereby modulating the roughness of the first surface.

Furthermore, in accordance with some preferred embodiments of the present invention, the method further comprises using the first surface as reflective surface for an optical application.

Furthermore, in accordance with some preferred embodiments of the present invention, the optical application comprises optical switching.

Furthermore, in accordance with some preferred embodiments of the present invention, the method is used for drag modulation.

Furthermore, in accordance with some preferred embodiments of the present invention, the first conductive layer is in the form of an elongated strip.

Furthermore, in accordance with some preferred embodiments of the present invention, the first conductive layer is in the form of a plate.

Furthermore, in accordance with some preferred embodiments of the present invention, there is provided a surface roughness modulation device, comprising a first pre-stressed electrically conductive layer coupled to a dielectric elastic foundation provided over a second conductive layer, whereby when the two conductive layers are subjected to a voltage difference the roughness of the first surface is modulated.

Furthermore, in accordance with some preferred embodiments of the present invention, the first layer comprises a reflective surface.

Furthermore, in accordance with some preferred embodiments of the present invention, the device is incorporated in an optical switch.

Furthermore, in accordance with some preferred embodiments of the present invention, the device is incorporated in a drag modulation apparatus.

Furthermore, in accordance with some preferred embodiments of the present invention, the first conductive layer is in the form of an elongated strip.

Furthermore, in accordance with some preferred embodiments of the present invention, the first conductive layer is in the form of a plate.

Furthermore, in accordance with some preferred embodiments of the present invention, the first layer comprises a metal foil.

Furthermore, in accordance with some preferred embodiments of the present invention, the dielectric elastic foundation is made from a polymer.

Furthermore, in accordance with some preferred embodiments of the present invention, the polymer is silicon rubber.

BRIEF DESCRIPTION OF THE DRAWINGS

In order to better understand the present invention, and appreciate its practical applications, the following Figures are provided and referenced hereafter. It should be noted that the Figures are given as examples only and in no way limit the scope of the invention. Like components are denoted by like reference numerals.

DETAILED DESCRIPTION OF PREFERRED EMBODIMENTS

A main aspect of the present invention is the use of electrostatic forces to change the roughness properties of a surface and the termination of the electrostatic forces to regain the initial roughness property (or smoothness).

Reference is made to FIG. 1 illustrating a roughness-modulation one-dimensional strip in accordance with a preferred embodiment of the present invention, in a pre-stressed state.

A pre-stressed electrically conductive layer (10) is bonded to a soft, dielectric elastic foundation (20). The elastic foundation is bonded to a rigid electrically conducting substrate (30). When no voltage is applied across the conducting layers, the pre-stressed layer is smooth or develops buckling patterns, depending on the parameters of the components of the system.

If the pre-stress is lower than a critical value, no buckling occurs and the pre-stressed layer remains smooth. On the other hand, if the applied voltage is higher than the critical value, the surface buckles and does not remain flat.

This mechanical behavior of a pre-stressed layer that is bonded to an elastic foundation was studied and is known (M. Hetényi, Beams on Elastic Foundation, U. of Mich. Press, Ann Arbor, 1946).

Figure 1A:
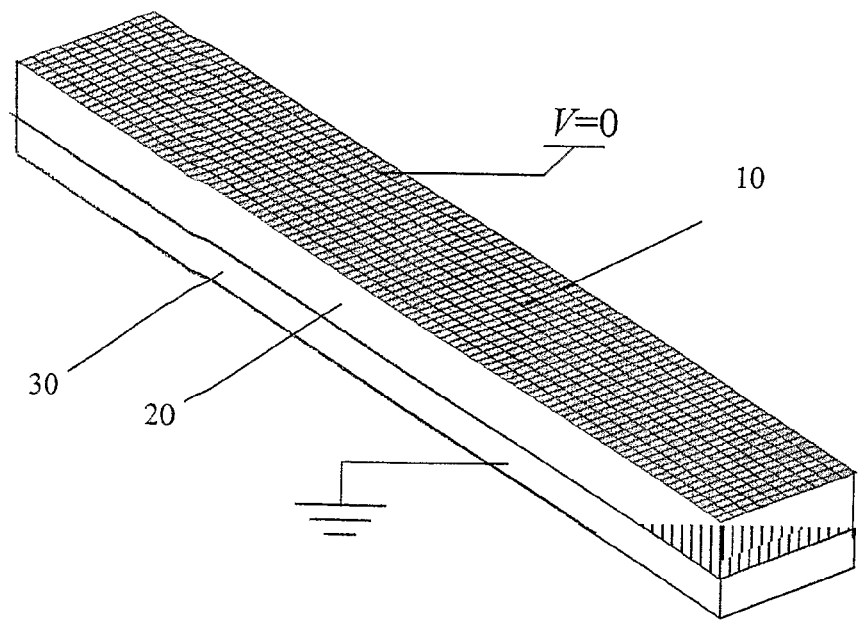
FIG. 1a illustrates a roughness-modulation one-dimensional strip in accordance with a preferred embodiment of the present invention, in a pre-stressed state.
Figure 1B:
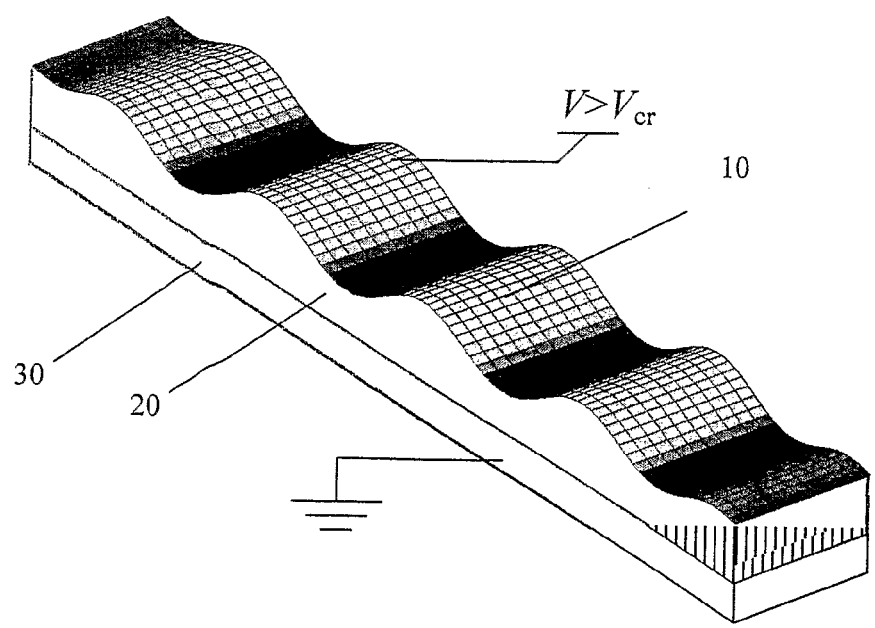
FIG. 1b illustrates a roughness-modulation strip in accordance with a preferred embodiment of the present invention, in an actuated stressed state.

However, a layer in which the pre-stress is below the critical value, and is therefore flat, can be forced to buckle by application of a sufficiently high voltage difference between the conducting pre-stressed layer 10 and the conducting rigid substrate 30 (see FIG. 1b). Termination of the applied voltage difference stops the buckling deformation and forces. the surface to become flat again (as shown in FIG. 1a). FIG. 1b shows one dimensional buckling patterns that develop in a narrow strip.

Figure 2A:
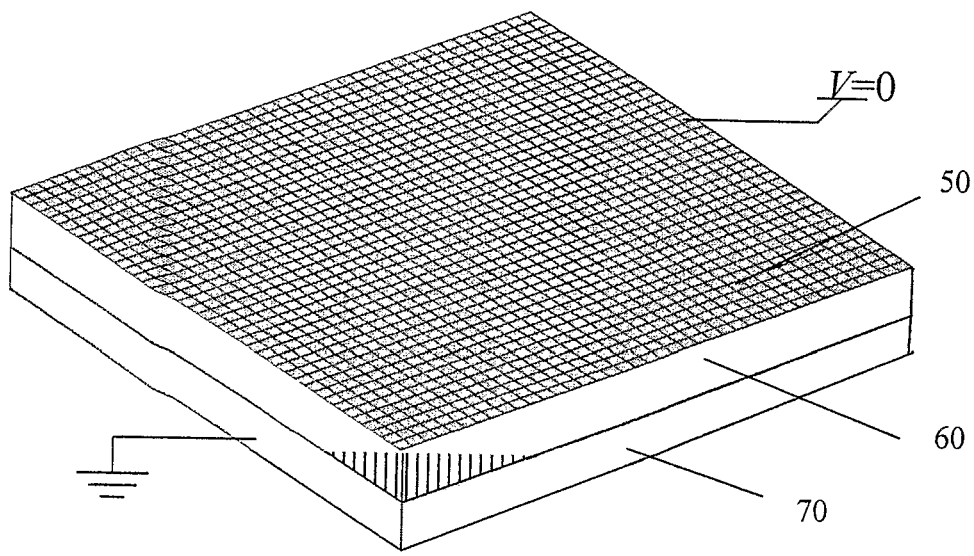
FIG. 2a illustrates a roughness-modulation two-dimensional plate in accordance with a preferred embodiment of the present invention, in a pre-stressed state.

FIG. 2a illustrates a roughness-modulation two-dimensional plate in accordance with a preferred embodiment of the present invention, in a pre-stressed state.

Figure 2B:
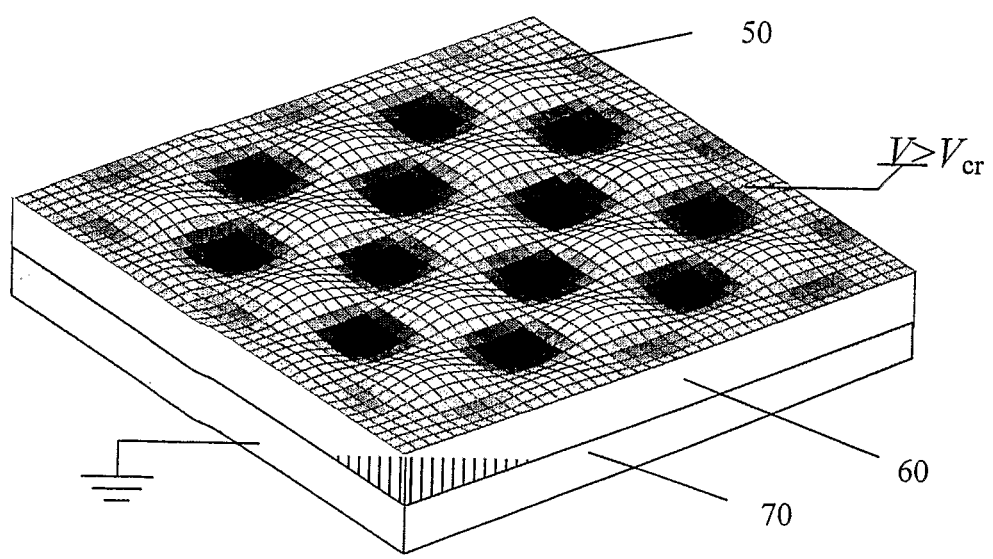
FIG. 2b illustrates a roughness-modulation two-dimensional plate in accordance with a preferred embodiment of the present invention, in an actuated stressed state.

FIG. 2b illustrates a roughness-modulation two-dimensional plate in accordance with a preferred embodiment of the present invention, in an actuated stressed state.

A wide pre-stressed layer (50) bonded to a dielectric elastic foundation (60) that is fixed to a rigid substrate (70). If the pre-stress is below a critical value, the layer remains flat (FIG. 2a). However, if a sufficiently high voltage is applied, two-dimensional buckling patterns develop in the pre-stressed layer (FIG. 2b).

Figure 3A:
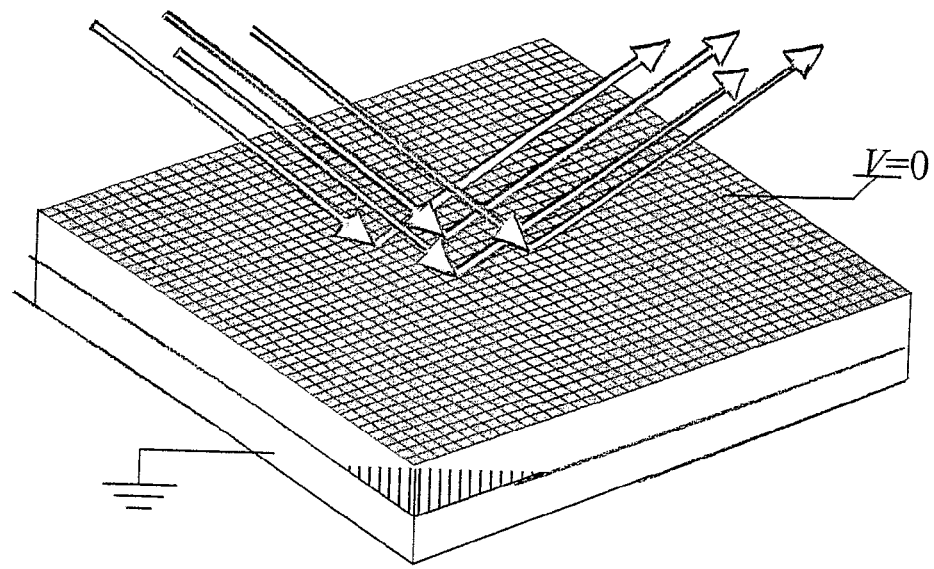
FIG. 3a illustrates the roughness-modulation two-dimensional plate in a pre-stressed state, acting as a flat reflective surface

FIG. 3a illustrates the roughness-modulation two-dimensional plate in a pre-stressed state, acting as a flat reflective surface.

Figure 3B:
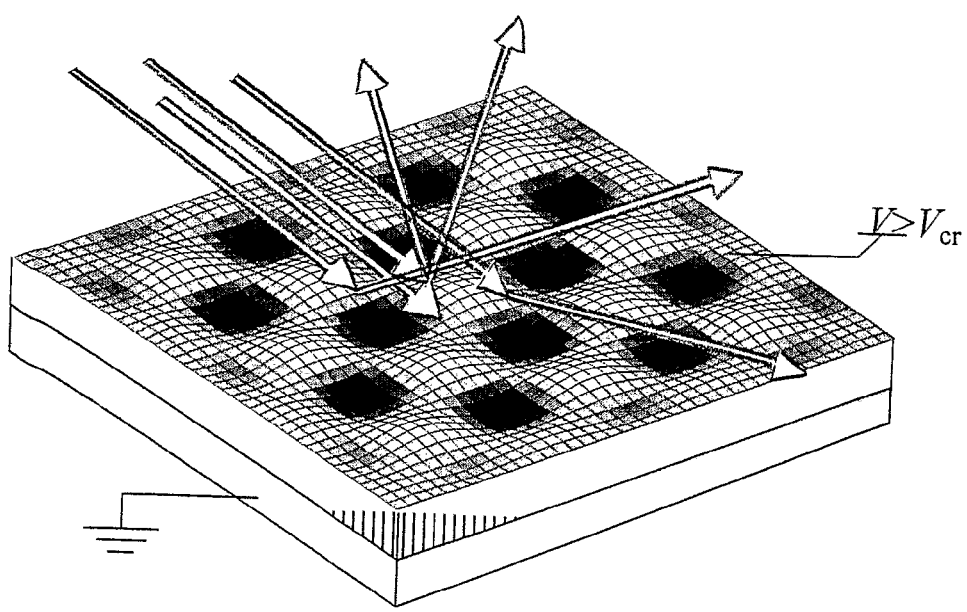
FIG. 3b illustrates the roughness-modulation two-dimensional plate in an actuated stressed state, acting as a distorted reflective surface.

FIG. 3b illustrates the roughness-modulation two-dimensional plate in an actuated stressed state, acting as a distorted reflective surface.

As an example of an optical application, the use of surface roughness modulation is demonstrated in FIGS. 3a and 3b to digitally control the reflection of a light beam. When no voltage is applied, the sub-critically pre-stressed layer is flat and reflects the beam as expected (FIG. 3a). When a sufficient voltage difference is applied, the sub-critically pre-stressed layer buckles, and the reflected light is dispersed in many directions (FIG. 3b). Termination of the applied voltage difference eliminates the buckling patterns and causes the sub-critically pre-stressed layer to become flat again (FIG. 3a). The present invention may for example be used in optical switching.

Modulation of surface roughness may be used for drag-modulation, in fluid mechanics applications, too.

The present invention is not limited to these uses and in fact any kind of application which utilizes surface roughness modulation in accordance with the present invention is covered by the present invention.

In general, the pre-stressed layer can be made of a thin sheet of an elastically deformable material (e.g., metal foil), the elastic foundation will be made of a soft polymer (e.g., Silicon rubber) and the rigid substrate from a thick slab of metal.

It should be clear that the description of the embodiments and attached Figures set forth in this specification serves only for a better understanding of the invention, without limiting its scope.

It should also be clear that a person skilled in the art, after reading the present specification could make adjustments or amendments to the attached Figures and above described embodiments that would still be covered by the present invention.

The invention claimed is:

1. A method for modulating roughness of a surface, comprising:
   providing a first pre-stressed electrically conductive layer coupled to a dielectric elastic foundation provided over a second conductive layer; and
   subjecting the two conductive layers to a voltage difference, thereby modulating the roughness of the first surface.

2. The method of claim 1, further comprising using the first surface as reflective surface for an optical application.

3. The method of claim 2, wherein the optical application comprises optical switching.

4. The method of claim 1, used for drag modulation.

5. The method of claim 1, wherein the first conductive layer is in the form of an elongated strip.

6. The method of claim 1, wherein the first conductive layer is in the form of a plate.

7. A surface roughness modulation device, comprising a first pre-stressed electrically conductive layer coupled to a dielectric elastic foundation provided over a second conductive layer, whereby when the two conductive layers are subjected to a voltage difference the roughness of the first surface is modulated.

8. The device of claim 7, wherein the first layer comprises a reflective surface.

9. The device of claim 8, incorporated in an optical switch.

10. The device of claim 7, incorporated in a drag modulation apparatus.

11. The device of claim 7, wherein the first conductive layer is in the form of an elongated strip.

12. The device of claim 7, wherein the first conductive layer is in the form of a plate.

13. The device of claim 7, wherein the first layer comprises a metal foil.

14. The device of claim 7, wherein the dielectric elastic foundation is made from a polymer.

15. The device of claim 14, wherein the polymer is silicon rubber.

* * * * *